INVENTOR.
WILLIAM V. RIDGEWAY
BY
*William G. Babcock*
ATTORNEY

United States Patent Office 3,626,593
Patented Dec. 14, 1971

3,626,593
ORTHODONTIC BRACKET
William V. Ridgeway, 3245 E. 1st St.,
Long Beach, Calif. 90803
Filed June 23, 1970, Ser. No. 49,107
Int. Cl. A61c 7/00
U.S. Cl. 32—14 A                                           9 Claims

ABSTRACT OF THE DISCLOSURE

A wire engageable orthodontic bracket that is particularly adapted for mounting on a tooth encircling band. The bracket includes a recessed wire engaging central portion, which central portion has two wings extending therefrom in opposite directions. The wings are of such configuration that they tend to guide a tensioned elastomeric ring that they engage into a seated position with the central portion, with the band when so seated serving to anchor the wire in the recessed position.

BACKGROUND OF THE INVENTION

Field of the invention

An orthodontic bracket which in combination with an elastomeric ring permits a resilient wire to be easily secured to the bracket to exert a desired force on a patient's tooth for correctional purposes.

Description of the prior art

Imperfections in the alignment of teeth have for many years been corrected by orthodontists by the use of brackets secured to the teeth, and the brackets being engaged by a resilient wire to exert a desired force on the teeth for correctional purposes. In the past, such wires were secured to the brackets by twisting operations which not only is time-consuming, but does not permit correctional dentistry to be carried out with the precision that is possible with later developments in this field.

A recent development in the field of orthodontics is to use elastomeric rings to secure tensioned resilient wire to brackets, which brackets are normally secured to the patient's teeth by resilient bands that encircle the latter. Such elastomeric rings while a distinct improvement over previous means of securing a tensioned wire to the brackets, have the operational disadvantages that the rings are difficult to mount on the prior art brackets, and may be inadvertently displaced from the brackets by the patient's tongue contacting the rings or wire to exert a substantial wire dislodging force thereon.

The purpose of the present invention is to provide an orthodontic bracket that is easily engaged by the resilient force imparting wire, and the bracket capable of having an elastomeric ring easily mounted thereon to anchor the wire to the bracket. The present orthodontic bracket overcomes the operational disadvantages of previously available brackets used for this purpose, in that applicant's invention not only permits the resilient force imparting wire to be easily secured thereto, but prevent the wire inadvertently being displaced from the bracket.

SUMMARY OF THE INVENTION

An orthodontic bracket that is particularly adapted to being secured to a tooth encircling band, with the bracket including a central portion in which a recess is formed that snugly engages a resilient force imparting wire, and the central portion having two rigid wings that extend outwardly therefrom in opposite directions. The wings are of such tapered configuration that they tend to guide a tensioned resilient ring into a seated position relative to the central portion, with the ring when so seated extending over the force imparting resilient wire and removably holding it within the confines of the recessed portion.

Upon it being desired to remove the force imparting wire from the recessed portion, the resilient ring is merely tensioned to deform it to the extent that it can be slipped over one of the wings, and then moved longitudinally relative to the other wing to disengage the ring therefrom. When the ring is so removed from the bracket, the force imparting wire may be lifted from the recessed central portion and disengaged therefrom.

A major object of the present invention is to provide an orthodontic bracket having an extremely simple mechanical structure, one that is easily secured to a tooth encircling band, is centrally recessed to permit easy and simple engagement with a force imparting wire, and the central portion of the bracket having two wings that extend outwardly therefrom in opposite directions that may be easily engaged by a resilient ring to removably hold and anchor it in said recessed portion.

Another object of the invention is to furnish an orthodontic bracket in which the oppositely and outwardly projecting wings are of such tapered configuration that when they are in engagement with a tensioned elastomeric ring, they will, due to their shape and configuration, tend to guide the ring into a seated position on the central portion when the ring is subjected to no external forces.

Yet another object of the invention is to supply an orthodontic bracket of such structure as to not only be easily engageable by a resilient ring to hold a force imparting wire in an anchored position on the bracket, but to prevent the anchored ring being inadvertently dislodged from the bracket by movement of the patient's tongue.

DESCRIPTION OF THE PREFERRED EMBODIMENT

Figure 1:
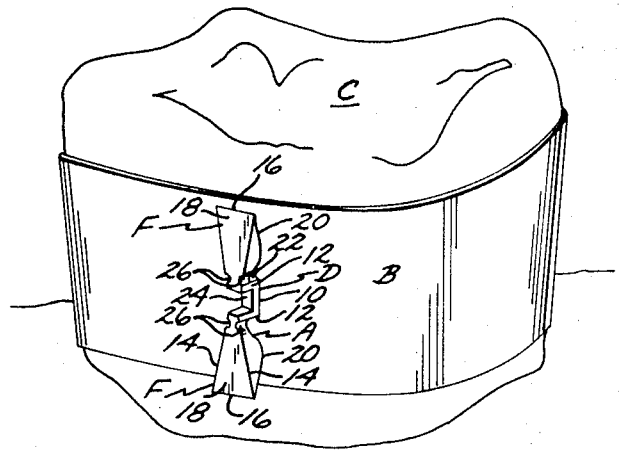
FIG. 1 is a perspective view of a single tooth that is encircled by a band, with the band serving as a mounting for a first form of one of the orthodontic brackets.
Figure 2:
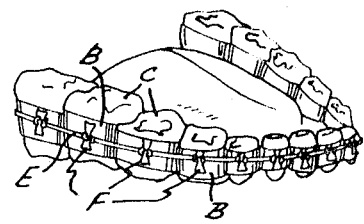
FIG. 2 is a perspective view of a sequence of teeth each of which is encircled by a band, with each band supporting an orthodontic bracket that is engaged by a force imparting resilient wire, and the wire being held on each bracket by an elastomeric ring that not only engages the wire, but the central potions of the bracket.
Figure 3:
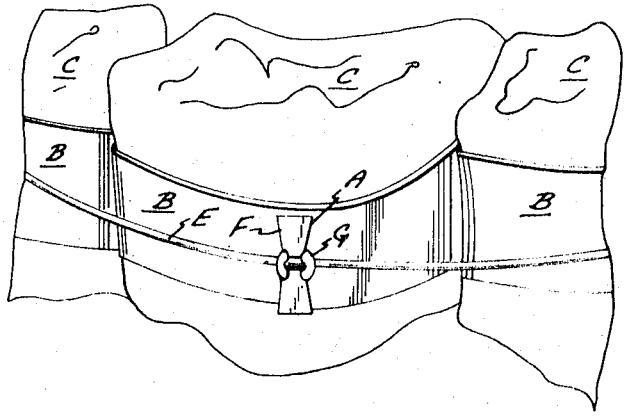
FIG. 3 is a perspective view of a sequence of teeth in which each tooth has a band encircling the same, with the bands each supporting a bracket that has a force imparting resilient wire secured thereto by an elastomeric ring.
Figures 5, 6, 7:
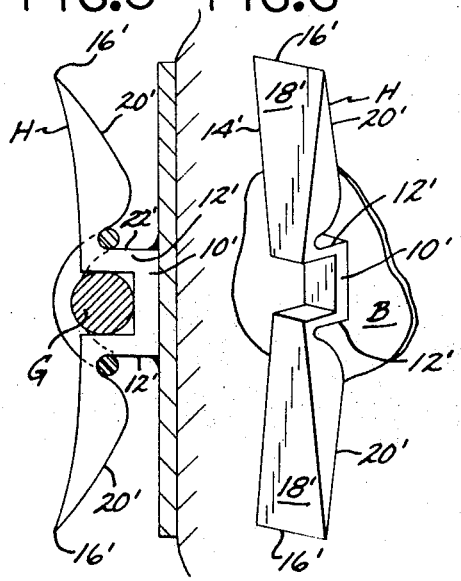
FIG. 5 is a side elevational view of a second form of the orthodontic bracket, with the bracket secured to a tooth encircling band.
FIG. 6 is a perspective view of the second form of bracket shown in FIG. 5.
FIG. 7 is a perspective view of a third form of orthodontic bracket.

A first form A of an orthodontic bracket is shown mounted on a band B that encircles a tooth C as may best be seen in FIGS. 1 to 3 inclusive of the drawing. The first form A of the orthodontic bracket includes a central portion D that is adapted to receive a tensioned resilient wire E that imparts a desired force to a tooth C as shown in FIG. 2. The recessed portion D of the first form A of bracket is of channel shaped configuration and is defined by a web 10 that has two laterally spaced flanges 12 projecting forwardly therefrom. The web 10 as may best be seen in FIG. 5 is secured to the band B by conventional means, such as an adhesive, welding or the like. The flanges 12 have two wings F projecting outwardly therefrom in opposite directions as shown in FIG. 1 with each of the wings being of an elongate configuration.

Each wing F as may be seen in FIG. 1 has two laterally spaced elongate side edges 14 that taper inwardly towards one another as they approach the flange 12. Each wing F includes a free end edge 16, which in conjunction with the longitudinal edges 14 serves to define a generally trapezoidal surface 18 on the first form of bracket A as may be seen in FIG. 1. Each wing F has a surface 20 that is adjacently disposed to the exterior surface of the band B, with this surface tapering in a compound curve that merges with the exterior surface 22 of the flange 12 with which that particular wing is associated. Each of the wings F as may best be seen in FIG. 5 is preferably angularly disposed relative to the band B and extends forwardly therefrom. The flanges 12 are so laterally spaced that they, in conjunction with the web 10, define a recess 24 that is longitudinally positioned relative to the band B, and of such size as to snugly engage the wire E as may be seen in FIG. 2.

Resilient rings G formed from a tough pollymerized resin material are manufactured by the Unitek Company and sold under the trademark Alastik, which rings G may be used to removably anchor the wire E in recesses 24 of the first forms A of the orthodontic bracket as shown in FIGS. 2 and 3. The rings G are used for this purpose by first positioning the wire E in recess 24, with the rings then being expanded to engage the wings F. Each pair of wings F when so engaged tend to guide a ring G into a seated position against the flanges 12 with which the wings are associated due to the tapering relationship of the side edges 14 and the rearwardly disposed compound curved surface 20.

After the ring G has been slid over one of the wings F to a seated position, the ring is tensioned to extend across the wire E in recess 24 and then caused to engage the other wing F. The second wing F so engaged guides the tensioned ring G to a seated position as shown due to the tapered arrangements of the side edges 14 and the rearward compound curved surface 20. If desired, pairs of grooves 26 may be formed in opposite sides of the wings F adjacent the recessed portion D to further engage the ring G when it is in a seated position on the bracket A as illustrated in FIG. 3.

A second form H of the orthodontic bracket is shown in FIGS. 5 and 6, and in identical with the first form A other than the grooves 26 are omitted therefrom. Elements in the second form H of the bracket that are common to those of the first form are identified in the drawing by the same numerals used in conjunction with the first form but with primes being added thereto.

A third form J of the bracket is shown in FIG. 7, that is of the same general configuration as the first form A, but with the rearward surface 21 of each wing being flat rather than of the compound curved configuration illustrated and described in connection with the first form A. Elements in the third form J that are common to the first form A are identified by the same numerals but with double primes being added thereto.

Figure 4:
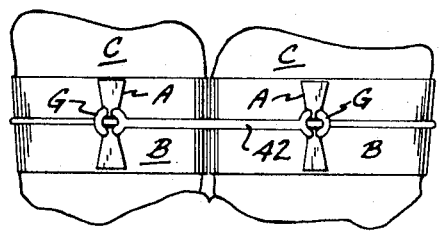
FIG. 4 is a front elevational view of two adjoining teeth that are ench encircled by a band, with each band supporting one of the brackets, and the two brackets being engaged by resilient rings that have an elongate resilient member extending therebetween.
Figure 8:
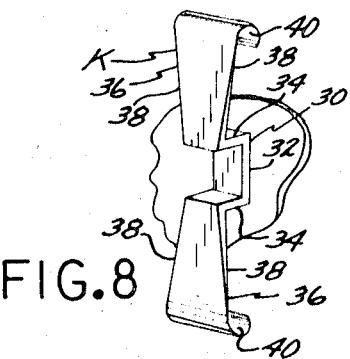
FIG. 8 is a fourth form of orthodontic bracket which includes curved end portions on the wings to prevent a resilient ring being inadvertently displaced from the bracket.

A fourth form K of the orthodontic bracket is shown in FIG. 8, which includes a recessed central portion 30 that is adapted to snugly engage a portion of the wire E, with the portion 30 being defined by a web 32 and two laterally spaced flanges 34 that extend forwardly therefrom. The web 32 is secured to a tooth encircling band B in the same manner as described in conjunction with the first form A of the bracket. The forward extremities of the flanges 34 support two oppositely extending wings 36, with each wing having two tapered side edges 38 that are of minimum spacing from one another at the position where the wing 36 merges with the forward portion of one of the flanges 34. Each of the wings 36 develops on its free outer extremity into a rearwardly curved hook 40 that is transversely disposed relative to the wing 38 of which it forms a part. The hooks 40 serve to prevent inadvertent displacement of the resilient rings G from seated positions on the fourth form of bracket K when the wings are seated thereon, and engage the wire E to anchor the latter to the bracket. It will be particularly noted in FIG. 4 that the resilient rings G may be connected by an elongate resilient member 42, with the connected rings still serving to hold the wire E in recessed portions D.

The use and operation of the brackets above described will be obvious from the previous description as well as the illustrations on the drawing and fourth description of the structure of the brackets and the use thereof is not required.

Although the use of resilient rings to secure the ligature wire E to the clamps is preferred, it will be apparent that the wire may be secured by conventional means such as has been used in the past.

I claim:

1. In combination with a metallic band that encircles a tooth, an orthodontic bracket secured to said band in a position to be engaged by a wire that is anchored thereto by a tensioned resilient ring of an elastomeric material, said bracket including:

(a) A channel shaped rigid member defined by a web and two laterally spaced flanges that cooperate to define a wire receiving recess, said web bonded to an exterior surface of said band, said recess longitudinally aligned relative said band, and said flanges extending outwardly relative to said web and band; and (b) two elongate, rigid, axially aligned wings of substantially greater length than the thickness of said wire that extend otuwardly from forward ends of said flanges in opposite vertical directions, each of said wings having side edges that taper inwardly towards one another and are of minimum transverse spacing adjacent the flange with which the wing is associated, with said tapered side edges guiding one of said tensioned resilient rings that is in engagement with inner surfaces of said wings and extends across said wire disposed in said recess to seat at least partially against outer external surfaces of said flanges.

2. An orthodontic bracket as defined in claim 1 which at least portions of the surfaces of said wings most adjacent said band taper towards said band to assist in guiding said tensioned ring to seat at least partially against outer external surfaces of said flanges.

3. An orthodontic bracket as defined in claim 1 in which the portions of said surfaces of said wings most adjacent said bands taper longitudinally in compound curves to cooperate with the exterior surfaces of said flanges to define transverse grooves in which opposite end portions of said tensioned ring is disposed.

4. An orthodontic bracket as defined in claim 1 which in addition includes:

(c) two hooks formed in the free end portions of said wings that extend toward said band and flanges to prevent inadvertent displacement of said ring from said bracket.

5. An orthodontic bracket as defined in claim 1 which in addition includes:

(c) first means on said wings for preventing inadvertent displacement of said ring from said bracket.

6. An orthodontic bracket as defined in claim 2 which in addition includes:
   (c) first means on said wings for preventing inadvertent displacement of said ring from said bracket.

7. An orthodontic bracket as defined in claim 3 which in addition includes:
   (c) first means on said wings for preventing inadvertent displacement of said ring from said bracket.

8. An orthodontic bracket as defined in claim 6 in which said first means are curved free end portions of said wings.

9. An orthodontic bracket as defined in claim 7 in which said first means are curved end portions of said wings.

References Cited

UNITED STATES PATENTS 3,530,583   9/1970   Klein et al. _____ 32—14

ROBERT PESHOCK, Primary Examiner